(12) United States Patent
Roberts

(10) Patent No.: US 11,951,969 B2
(45) Date of Patent: Apr. 9, 2024

(54) CONTROL ARRANGEMENT FOR A BRAKE SYSTEM

(71) Applicant: ZF Active Safety US Inc., Livonia, MI (US)

(72) Inventor: Curt Roberts, Livonia, MI (US)

(73) Assignee: ZF Active Safety US Inc., Livonia, MI (US)

( * ) Notice: Subject to any disclaimer, the term of this patent is extended or adjusted under 35 U.S.C. 154(b) by 169 days.

(21) Appl. No.: 17/708,019

(22) Filed: Mar. 30, 2022

(65) Prior Publication Data

US 2023/0311826 A1  Oct. 5, 2023

(51) Int. Cl.
*B60T 8/88* (2006.01)
*B60T 13/68* (2006.01)

(52) U.S. Cl.
CPC ........... *B60T 8/885* (2013.01); *B60T 13/686* (2013.01); *B60T 2220/04* (2013.01); *B60T 2270/402* (2013.01); *B60T 2270/413* (2013.01); *B60T 2270/82* (2013.01)

(58) Field of Classification Search
CPC .... B60T 8/885; B60T 13/686; B60T 2220/04; B60T 2270/402; B60T 2270/413; B60T 2270/82
See application file for complete search history.

(56) References Cited

U.S. PATENT DOCUMENTS

2021/0380088 A1* 12/2021 Yoo .......................... B60L 7/18
2023/0048177 A1   2/2023 Ganzel
2023/0146790 A1*  5/2023 Kim ....................... B60T 8/267
                                                     303/3
2023/0356731 A1* 11/2023 Chen ................. B60W 50/0225

FOREIGN PATENT DOCUMENTS

DE   102011108297 A1    8/2012
DE   102013224870 A1    9/2014
DE   102018002990 A1   10/2019
DE   102018003001 A1   10/2019

OTHER PUBLICATIONS

German Search Report for corresponding Application No. 10 2023 202 534.5, dated Nov. 28, 2023 for applicant ZF Active Safety US Inc., pp. 1-10.

* cited by examiner

*Primary Examiner* — Jacob M Amick
(74) *Attorney, Agent, or Firm* — Robert James Harwood

(57) ABSTRACT

A control arrangement for a brake system having a plurality of electrically-controlled hydraulic valves includes a primary electronic control unit ("ECU") including a primary microcontroller for selectively providing at least one of electrical power and a control signal in a normal non-failure braking mode. A secondary ECU is electrically connected to the primary ECU via a power connector and a controller area network ("CAN") communication bus. The secondary ECU obtains electrical power from a wiring system of a vehicle associated with the brake system. A backup microcontroller is associated with a chosen one of the primary and secondary ECUs, receiving electrical power and a control signal from the secondary ECU. The backup microcontroller selectively provides at least one of electrical power and a control signal in a backup braking mode responsive to the control signal from the secondary ECU.

15 Claims, 4 Drawing Sheets

CONTROL ARRANGEMENT FOR A BRAKE SYSTEM

TECHNICAL FIELD

This disclosure relates to an apparatus and method for control of a brake system and, more particularly, to a method and apparatus for control of a hydraulic brake system including normal non-failure and backup braking modes.

BACKGROUND

A brake system may include a plurality of wheel brakes and a hydraulic braking pressure generator, a braking pressure modulator or valve which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include at least one electronic control unit that can be used to provide a braking command to the wheel brakes by controlling the valve(s), autonomously and/or manually (e.g., via the use of an operator-manipulable brake pedal). In some use environments, it may be desirable to provide redundancy in certain portions of the brake system. This is often accomplished by duplication of components and/or provision of dual-wound coils for the valves, but certain of these solutions may add expense and/or complexity to the brake system.

SUMMARY

In an aspect, a control arrangement for a brake system having a plurality of electrically-controlled hydraulic valves, each valve including a coil, is disclosed. The control arrangement includes a primary electronic control unit ("ECU") including a primary microcontroller for selectively providing at least one of electrical power and a control signal to a load device and/or a coil in a normal non-failure braking mode. A secondary ECU is electrically connected to the primary ECU via a power connector and a controller area network ("CAN") communication bus. The secondary ECU obtains electrical power from a wiring system of a vehicle associated with the brake system. A backup microcontroller is associated with a chosen one of the primary and secondary ECUs. The secondary ECU supplies electrical power and a control signal to the backup microcontroller. The backup microcontroller selectively provides at least one of electrical power and a control signal to the load device and/or coil in a backup braking mode responsive to the control signal from the secondary ECU.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
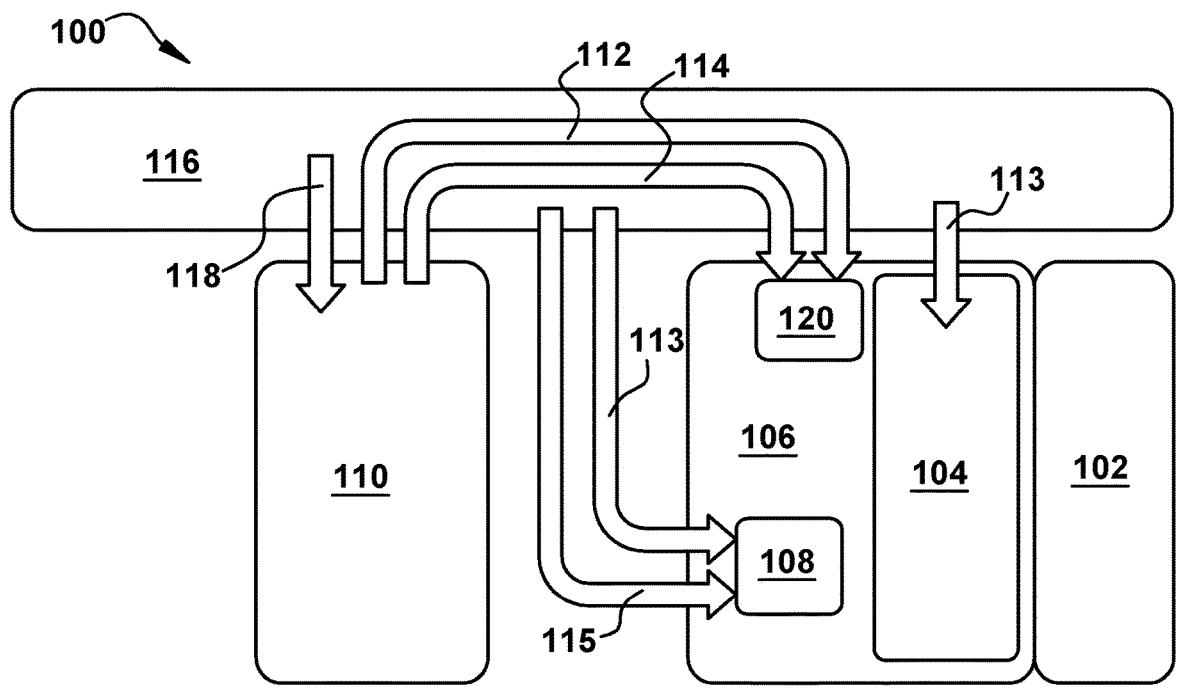
FIG. 1 is a schematic conceptual diagram of a control arrangement according to an aspect of the present invention.

FIG. 1 schematically depicts a control arrangement 100 for a brake system having a plurality of electrically-controlled hydraulic valves, depicted collectively and schematically at 102. Each valve 102 includes a coil, depicted collectively and schematically at 104. The coils 104 may be, for example, one or more dual wound and/or single wound coils 104 of solenoid controlled valves.

The control arrangement includes a primary electronic control unit ("ECU") 106 including a primary microcontroller 108 for selectively providing at least one of electrical power and a control signal to at least one load device in a normal non-failure braking mode. The load device may be at least one of a coil 104, a motor, a sensor, a lamp, any combination thereof, or any other desired component which uses at least one of electrical power and a control signal; for clarity of description herein, a load device and/or a coil 104 will be presumed to be any desired recipient of at least one of electrical power and a control signal, regardless of source or of operating mode of the brake system. The load device will be shown and described below as being at least one coil 104 of a hydraulic valve 102.

The primary ECU 106 may directly or indirectly obtain the control signal in the normal non-failure braking mode from at least one of a brake pedal assembly and a deceleration signal transmitter of the vehicle, in at least one of a wired and a wireless manner, or in any other desired fashion. For example, and as shown in the Figures, the coil 104 and/or primary microcontroller 108 can receive electrical power from a wiring system 116 of the vehicle via power connectors 113 and/or can receive control signals from the wiring system 116 via controller area network ("CAN") communication bus 115. Since the power connectors 113 and/or CAN bus 115 (shown schematically in FIG. 1) are presumed to be supplying electricity and/or signals to the coil 104 and/or primary microcontroller 108 in a known manner during normal non-failure operation, further discussion of these components will be omitted here, for clarity.

A secondary ECU 110 is electrically connected to the primary ECU 106 via a power connector 112 and a controller area network ("CAN") communication bus 114, which may be combined with the normal wiring system of the vehicle or routed separately. The secondary ECU 110 obtains electrical power from a wiring system 116 of a vehicle associated with the brake system. The power connection from the wiring system 116 to the secondary ECU 110 is shown schematically at 118 in FIG. 1. The secondary ECU 110 may obtain the control signal (and/or inputs contributing thereto) from any desired source.

A backup microcontroller 120 may be associated with a chosen one of the primary and secondary ECUs 106 and 110. The secondary ECU 110 supplies electrical power (through the power connector 112) and a control signal (through the CAN communication bus 114) to the backup microcontroller 120. When present, the backup microcontroller 120 selectively provides at least one of electrical power and a control signal to at least one coil 104 when the brake system is in a backup braking mode, responsive to the control signal from the secondary ECU 110. The backup microcontroller 120 may be located remotely from both the primary and secondary ECUs 106 and 110. The backup microcontroller 120 may be included in a package unit with the secondary ECU 110. As shown in at least FIG. 1, the backup microcontroller 120 may be included in a package unit with the primary ECU 106.

The secondary ECU 110 may directly or indirectly obtain the control signal in at least one of the normal non-failure and backup braking modes from at least one of a brake pedal assembly and a deceleration signal transmitter of the vehicle, in at least one of a wired and a wireless manner, or in any other desired fashion. It is contemplated that the control signal could be developed by the primary or secondary ECU 106 or 110 based upon "raw" inputs, or could be provided to the primary and/or secondary ECU 106 or 110 from another component of the vehicle such as, but not limited to, an autonomous driving controller.

Figure 2:
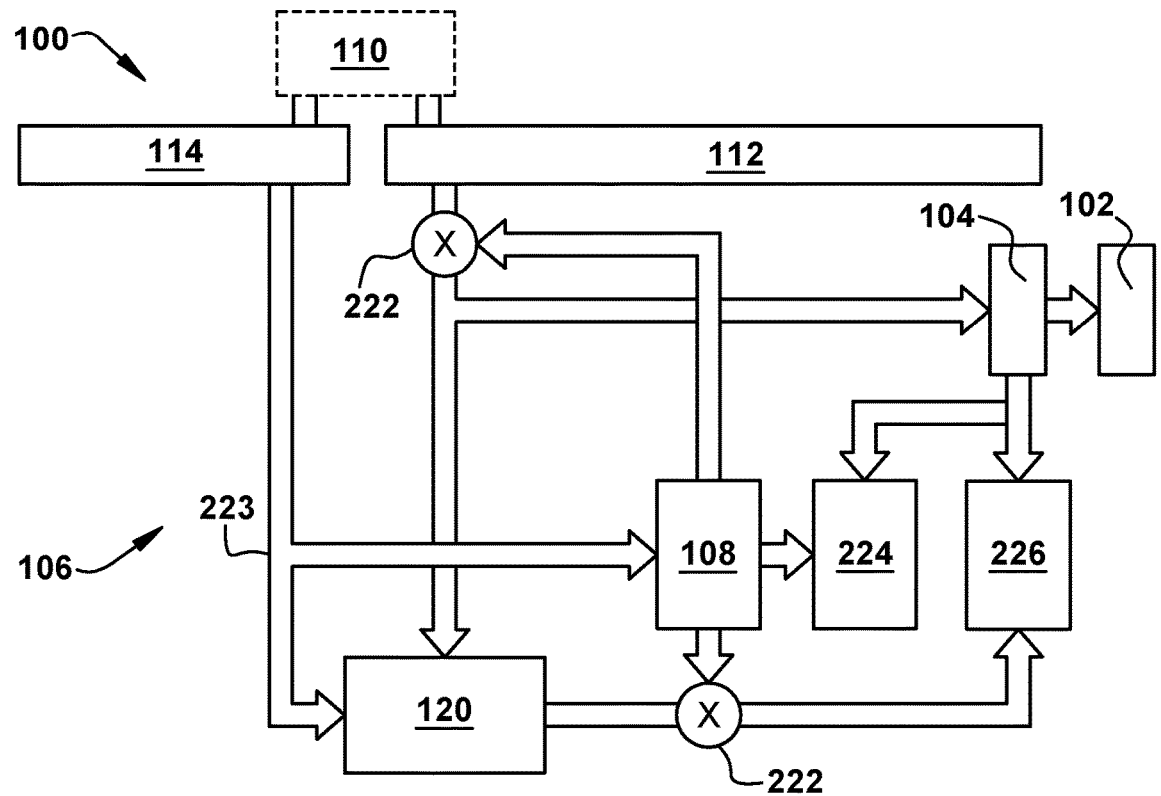
FIG. 2 is a schematic diagram of the control arrangement of FIG. 1, in a first configuration.

With reference now to FIG. 2, the primary ECU 106 is shown schematically in detail, in a first configuration, along with other portions of the control arrangement 100. For the sake of description, the backup microcontroller 120 is presumed to be included in the primary ECU 106 as shown, but could instead be at any other location in the vehicle. In FIG. 2, the "X-ed out" switching points 222 denote that the primary microcontroller 108 is preventing flow of at least one of electrical power and control signal to/from the backup microcontroller 120 in the normal non-failure braking mode. In this arrangement, the backup microcontroller 120 would then come online and receive electrical power and control signal when the control arrangement 100 enters the backup braking mode. For example, the switching points 222 could default to sending respective electrical power and control signal(s) from the secondary ECU 110 to the backup microcontroller 120 when the primary microcontroller 108 is determined to be inactive. It Is contemplated, though, that the backup microcontroller 120 could receive electrical power and/or control signal flow even when the control arrangement is in the normal non-failure mode, to "shadow" the primary microcontroller 108 as desired, such as to be ready to quickly take over control of the brake system as needed, to confirm or correct the primary microcontroller 108 actions, or for any other desired reason.

As shown in FIG. 2, the CAN communication bus 114 may be electrically connected to both the primary and backup microcontrollers 108 and 120 via a common CAN wire 223 extending, directly or indirectly, between the secondary ECU 110 (here, CAN communication bus 114) and the primary ECU 106 (here, to backup microcontroller 120). It is contemplated that any desired number of physical connections (e.g., plugs, hard-wires, or any other type of wired or wireless linkage) could be used to implement the connections shown schematically in the Figures; one of ordinary skill in the art can handle the logistics and mechanics of routing the power and/or signals according to aspects of the present invention. The term "common CAN wire" is used herein to indicate a single co-located conduit or cable, which can comprise a plurality of individual wire strands. The common CAN wire here is used to indicate a situation in which the wire strands are not routed separately to their destinations, but instead at least partially follow a common path as a single, unitary cable.

FIG. 2 also schematically depicts primary and backup control switches 224 and 226, respectively. The primary and backup control switches 224 and 226 are used to help "translate" control signal based commands from the primary and/or backup microcontrollers 108 and 120 to actuate the coils 104 and thus cause the valves 102 to route hydraulic fluid as desired. As shown schematically in FIG. 2, the primary microcontroller 108 is connected to provide at least one of electrical power and the control signal to the coil(s) 104 in the normal non-failure braking mode via the primary control switch 224. Similarly, the backup microcontroller 120 provides at least one of electrical power and the control signal to the coil(s) 104 in the backup braking mode via the backup control switch 226.

Figure 3:
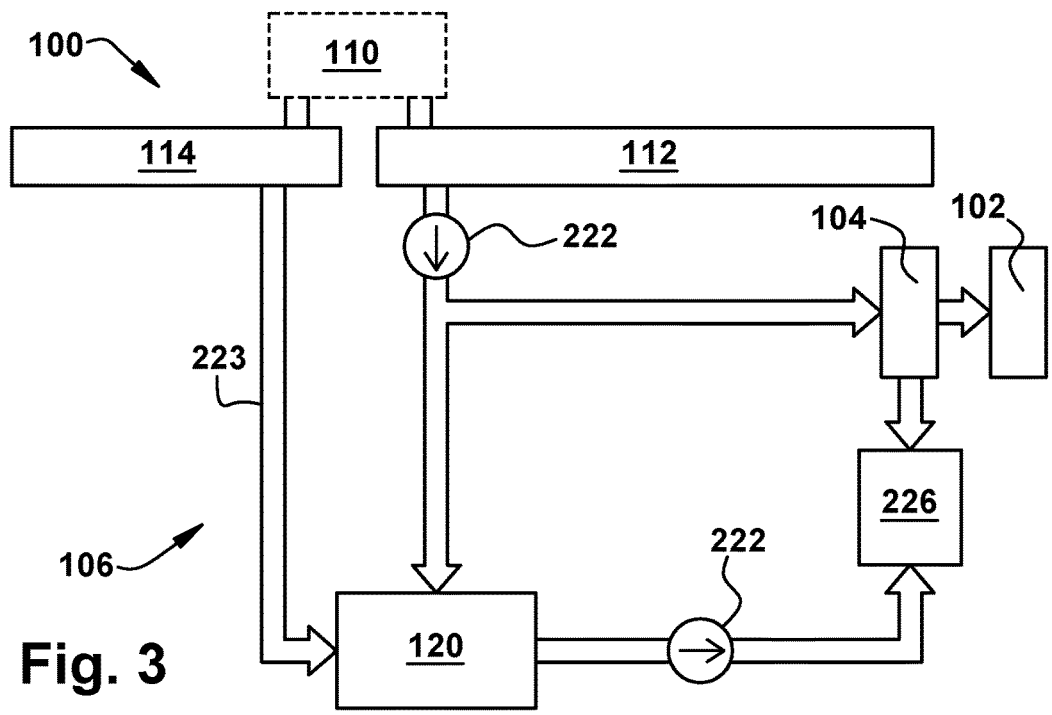
FIG. 3 is a schematic diagram of the control arrangement of FIG. 1, in a second configuration.

In summary, FIG. 2 schematically depicts the control arrangement 100 in a first configuration representing a normal non-failure braking mode. Turning now to the second configuration of the control arrangement 100 shown in FIG. 3, a backup braking mode version of the control arrangement 100 is depicted, as is made clear by the absence of the primary microcontroller 108 (and associated signal/power flow paths) from this Figure and the "arrowed" switching points 222, denoting that signal and/or power is flowing through them between the backup microcontroller 120 and the CAN communication bus 114 and/or the power connector 112. In the arrangement of FIG. 3, the primary microcontroller 108 is effectively unavailable for some reason, so the backup microcontroller 120 is operating via the backup control switch 226 to control the coils 104 (and thus the valves 102) as desired for backup braking mode use of the brake system.

This backup braking mode configuration of the control arrangement 100, shown in FIG. 3, could be merely temporary and the operator of the vehicle could be apprised of the situation and/or advised to conduct maintenance on the brake system, as desired by a provider of the brake system, the vehicle, and/or the control arrangement. Alternatively, the backup braking mode could be utilized as a long-term operational configuration as desired. To that end, it is also contemplated that the primary and backup components, as described herein, could be reversed such that the primary microcontroller 108 is used during a backup braking mode, and the backup microcontroller 120 is used for a normal non-failure braking mode. One of ordinary skill in the art will be able to configure a suitable control arrangement for a particular use environment of a brake system, as desired.

Figure 4:
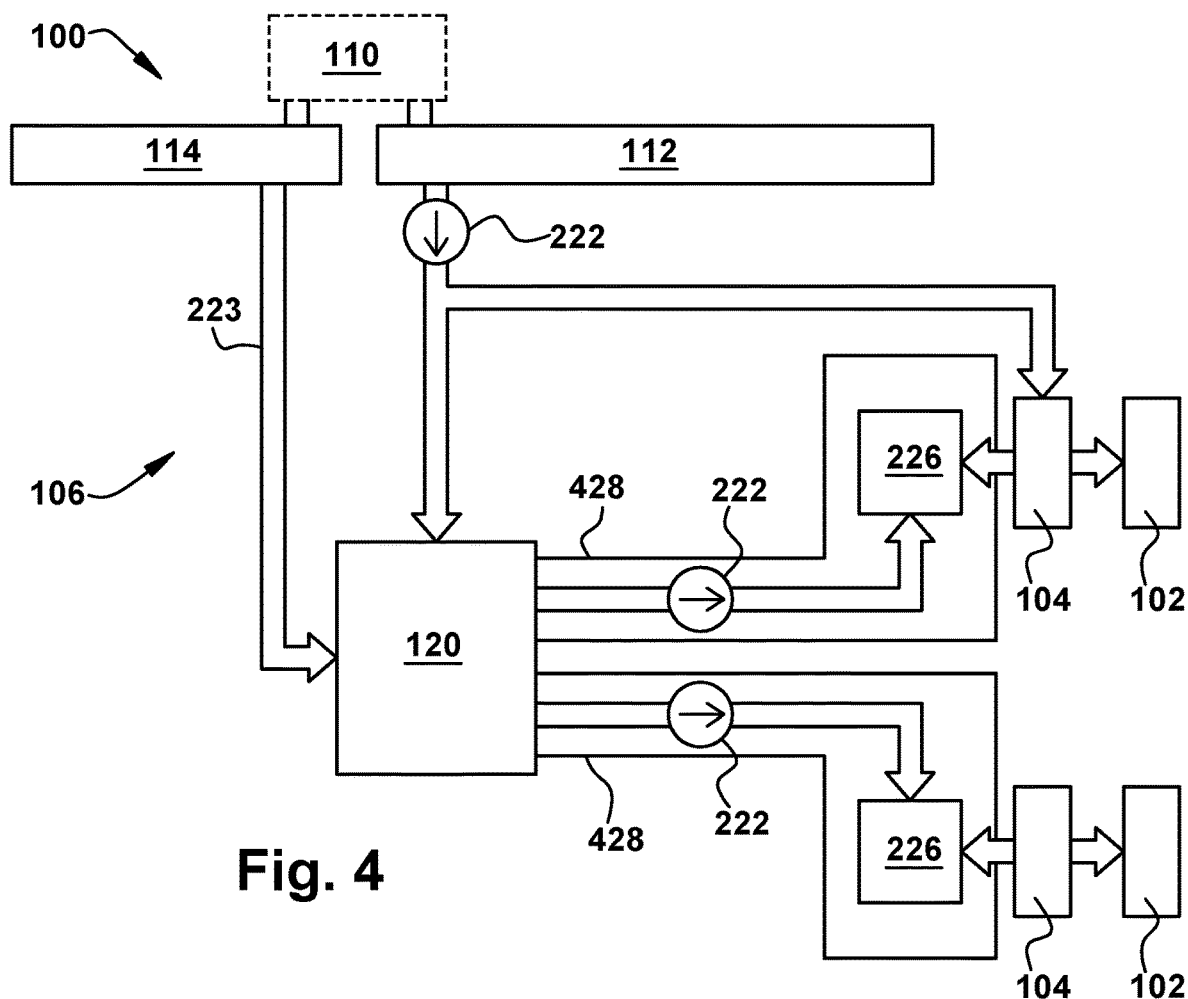
FIG. 4 is a schematic diagram of the control arrangement of FIG. 1, in a third configuration.

With reference to FIG. 4, a third configuration of the control arrangement 100 is shown. Like that of FIG. 3, the control arrangement shown in FIG. 4 schematically depicts a backup braking mode, with the primary microcontroller 108 being unavailable. As depicted schematically by unit box 428, it is also contemplated that each coil 104 may be associated with at least one selected backup control switch 226 of a plurality of backup control switches 226, all of which are connected to backup microcontroller 120 to receive control signal and/or power flow. Unit box 428 represents one of the plurality of backup control switches 226 (and associated wiring or other signal and/or power conduits); a plurality of unit boxes 428 (two shown as examples, with certain connections omitted for clarity) can be provided to one or more of the valves 104 of the brake system.

Figure 5:
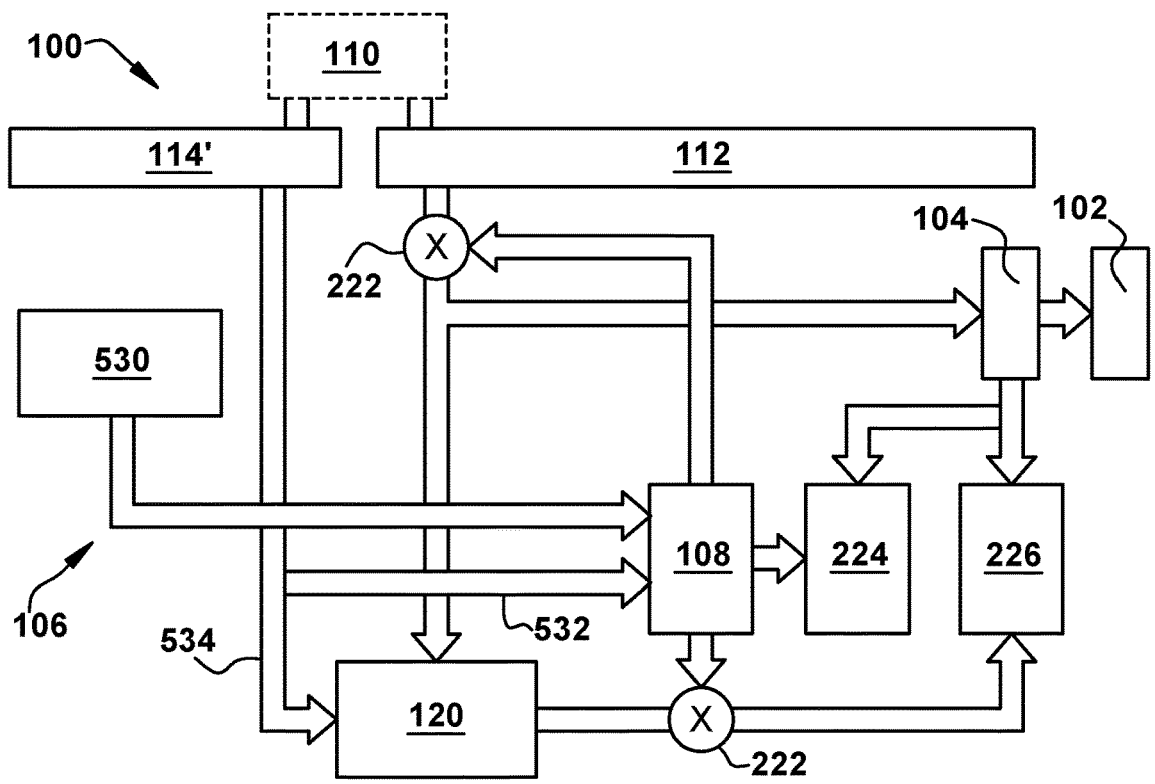
FIG. 5 is a schematic diagram of the control arrangement of FIG. 1, in a fourth configuration.
Figure 6:
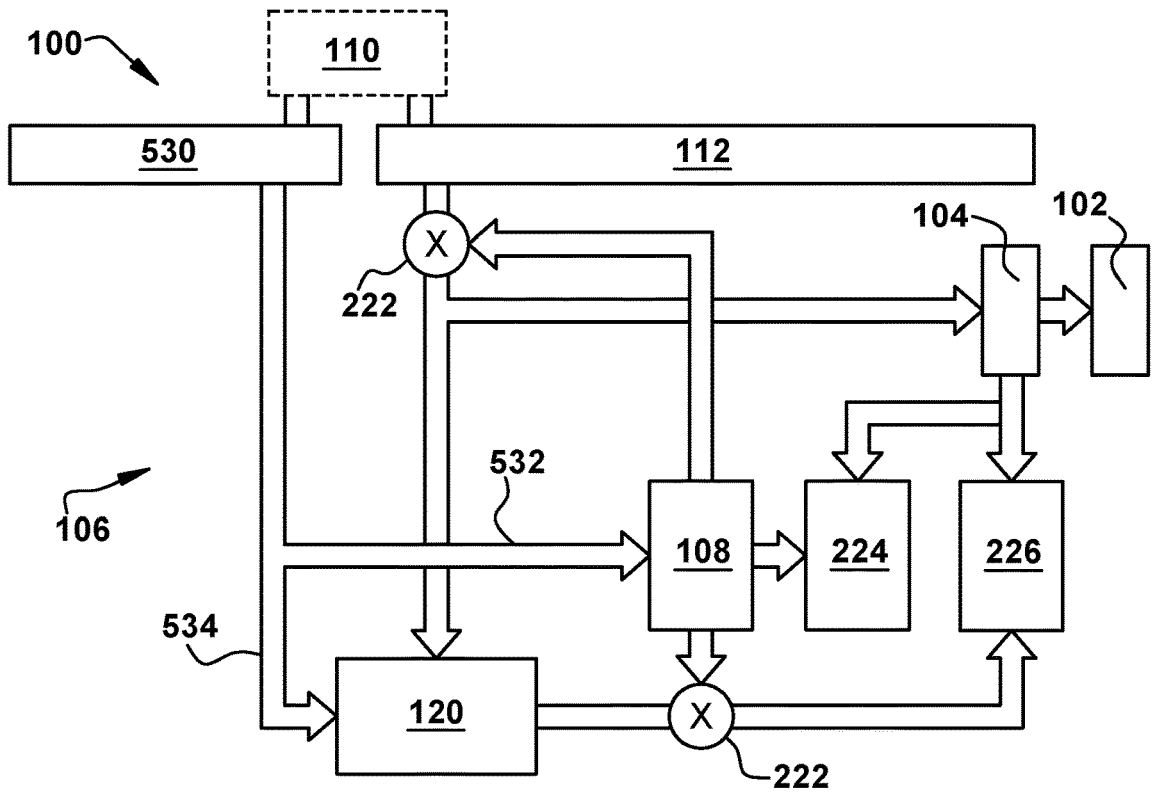
FIG. 6 is a schematic diagram of the control arrangement of FIG. 1, in a fifth configuration.

FIGS. 5-6 depict fourth and fifth configurations of the control arrangement 100, respectively, in a normal non-failure braking mode, with the primary microcontroller 108 providing power and/or control signal flow to the coils 104 and the switching points 222 in the "X-ed out" condition. (Again, when the switching points 222 are X-ed out, the backup microcontroller 120 may still receive power and/or control signal communication, but the primary microcontroller 108 is actually controlling the coils 104.)

In the fourth configuration of the control arrangement 100 shown schematically in FIG. 5, the CAN communication bus shown is a private, standalone CAN communication bus 114', sending control signals to at least one of the primary and backup microcontrollers 108 and 120 from the secondary ECU 110. That is, the CAN communication bus 114 may be a first CAN communication bus, and a second CAN communication bus 114' selectively provides the control signal to at least one of the primary and backup microcontrollers 108 and 120.

A vehicle CAN communication bus (shown schematically at 530), which may be part of the general vehicle wiring system 116, may also be provided to the control arrangement 100 in FIGS. 5-6, potentially as a redundant and/or robust source of signal to the primary microcontroller 120. Stated differently, the second CAN communication bus 114' previously mentioned may be a vehicle CAN communication bus 530, separate from the first CAN communication bus 114 associated with the secondary ECU 110. In the control arrangement 100 schematically depicted in FIG. 5, the vehicle CAN communication bus 530 is provided in addition to the CAN communication bus 114 from the secondary ECU 110. In the control arrangement 100 schematically depicted in FIG. 6, there is no (first) CAN communication bus 114 associated with the secondary ECU 110, and instead, the vehicle CAN communication bus 530 provides control signal flow directly to both the primary and backup microcontrollers 108 and 120, through a single wire (or bundle/set of wires, as previously mentioned) or through the depicted, separately routed, primary and secondary CAN wires 532 and 534.

As shown in FIGS. 5-6, the CAN communication bus 114 may be electrically connected to the primary and backup microcontrollers 108, 120 via separate primary and secondary CAN wires 532 and 534, respectively, extending between the secondary ECU 110 and the primary ECU 106. This separation in wires may be helpful in diagnostics and/or providing redundancy in the system.

Figure 7:
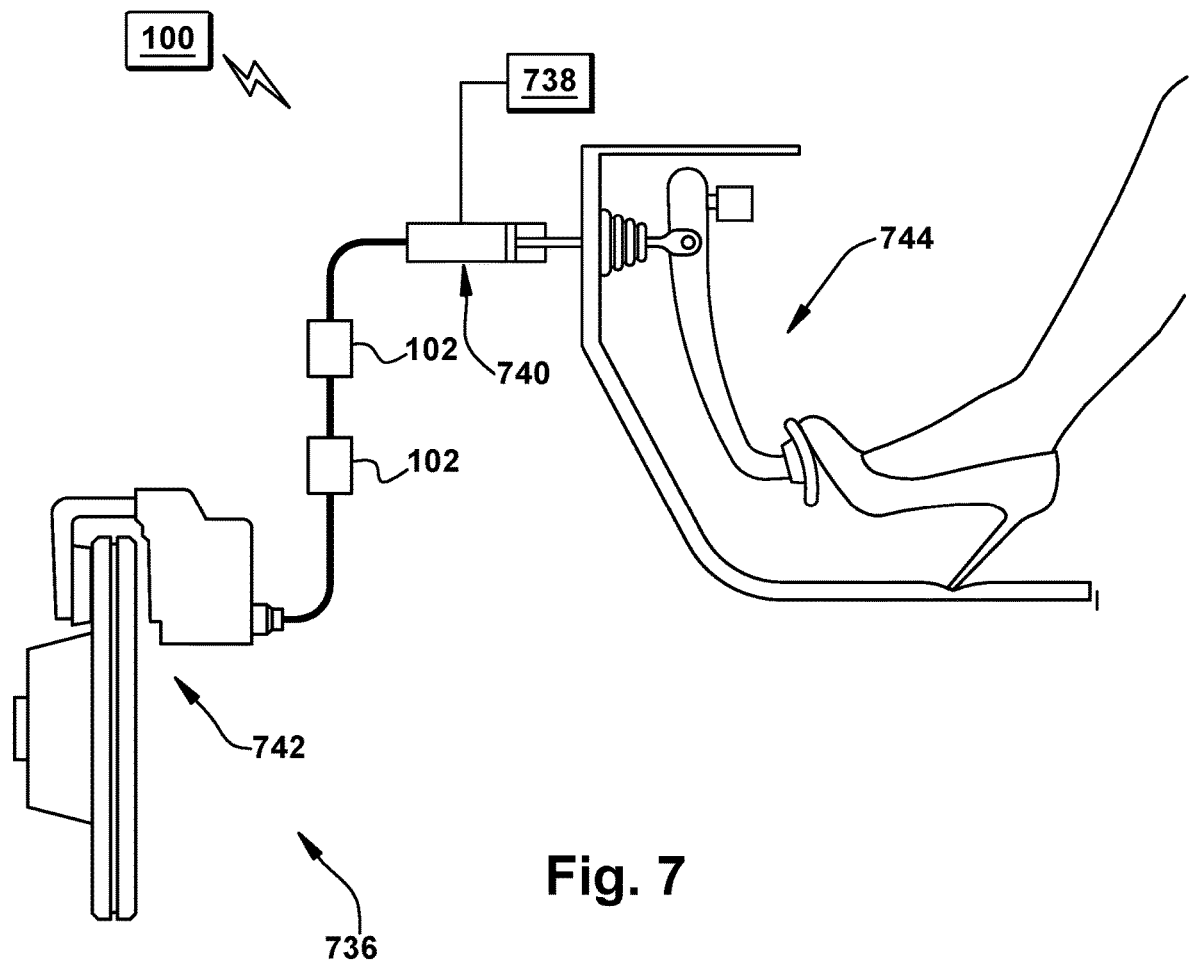
FIG. 7 is a schematic hydraulic diagram of a brake system, including the control arrangement of FIG. 1.

Finally, FIG. 7 schematically depicts the control arrangement 100 as incorporated into a brake system 736 of a vehicle. The brake system 736 may be or resemble, as one nonlimiting example, the brake system shown and described in copending U.S. patent application Ser. No. 17/400,386, titled "Apparatus and Method for Control of a Hydraulic Brake System", filed 12 Aug. 2021 and incorporated herein by reference in its entirety. The brake system 736 includes a reservoir unit 738 for supplying hydraulic fluid to one or more electrically-controlled hydraulic valves 102, a source of pressurized hydraulic fluid 740 in fluid communication with the reservoir unit 738, and a plurality of wheel brakes 742 (one shown, of a caliper style). The plurality of electrically-controlled hydraulic valves 102 is configured to place the source of pressurized hydraulic fluid 740 in selective fluid communication with the plurality of wheel brakes 742. Upon receipt of a braking control signal, such as from pressure of a driver's foot exerted upon a brake pedal 744 or from another deceleration signal generator or transmitter, the control arrangement 100 provides predetermined routing of hydraulic fluid, via the power and control signals transmitted between and among the various components of the control arrangement 100, to apply or release the wheel brakes 742 as desired.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A control arrangement for a brake system having a plurality of electrically-controlled hydraulic valves, each valve including a coil, the control arrangement comprising:
   a primary electronic control unit ("ECU") including a primary microcontroller for selectively providing at least one of electrical power and a control signal to a load device and/or a coil in a normal non-failure braking mode;
   a secondary ECU, electrically connected to the primary ECU via a power connector and a controller area network ("CAN") communication bus, the secondary ECU obtaining electrical power from a wiring system of a vehicle associated with the brake system;
   wherein a backup microcontroller is associated with a chosen one of the primary and secondary ECUs, the backup microcontroller receiving electrical power and a control signal from the secondary ECU, the backup microcontroller selectively providing at least one of electrical power and a control signal to the load device and/or coil in a backup braking mode responsive to the control signal from the secondary ECU.

2. The control arrangement of claim 1, wherein the secondary ECU obtains the control signal in at least one of the normal non-failure and backup braking modes from at least one of a brake pedal assembly and a deceleration signal transmitter of the vehicle, in at least one of a wired and a wireless manner.

3. The control arrangement of claim 1, wherein the primary ECU obtains the control signal in the normal non-failure braking mode from at least one of a brake pedal assembly and a deceleration signal transmitter of the vehicle, in at least one of a wired and a wireless manner.

4. The control arrangement of claim 1, wherein the backup microcontroller is located remotely from both the primary and secondary ECUs.

5. The control arrangement of claim 1, wherein the backup microcontroller is included in a package unit with the primary ECU.

6. The control arrangement of claim 1, wherein the backup microcontroller is included in a package unit with the secondary ECU.

7. The control arrangement of claim 1, wherein the primary microcontroller prevents flow of at least one of electrical power and control signal to/from the backup microcontroller in the normal non-failure braking mode.

8. The control arrangement of claim 1, wherein the primary microcontroller provides at least one of electrical power and the control signal to the load device and/or coil in the normal non-failure braking mode via a primary control switch.

9. The control arrangement of claim 1, wherein the backup microcontroller provides at least one of electrical power and the control signal to the a load device and/or coil in the backup braking mode via a backup control switch.

10. The control arrangement of claim 9, wherein each load device and/or coil is associated with a selected backup control switch of a plurality of backup control switches.

11. The control arrangement of claim 1, wherein the CAN communication bus is a first CAN communication bus, and wherein a second CAN communication bus selectively provides the control signal to at least one of the primary and backup microcontrollers.

12. The control arrangement of claim 11, wherein the second CAN communication bus is a vehicle CAN communication bus, separate from the first CAN communication bus associated with the secondary ECU.

13. The control arrangement of claim 5, wherein the CAN communication bus is electrically connected to the primary and backup microcontrollers via a common CAN wire extending between the secondary ECU and the primary ECU.

14. The control arrangement of claim 5, wherein the CAN communication bus is electrically connected to the primary and backup microcontrollers via separate primary and secondary CAN wires, respectively, extending between the secondary ECU and the primary ECU.

15. A brake system, comprising:
   the control arrangement of claim 1;
   a reservoir unit;
   a source of pressurized hydraulic fluid in fluid communication with the reservoir unit; and
   a plurality of wheel brakes;
   wherein the plurality of electrically-controlled hydraulic valves is configured to place the source of pressurized hydraulic fluid in selective fluid communication with the plurality of wheel brakes.

\* \* \* \* \*